United States Patent
Morcom

(10) Patent No.: US 8,098,712 B2
(45) Date of Patent: Jan. 17, 2012

(54) OPTICAL CORRELATION APPARATUS AND METHOD

(75) Inventor: Christopher John Morcom, Westbere (GB)

(73) Assignee: Instro Precision Limited, Broadstairs (GB)

( * ) Notice: Subject to any disclaimer, the term of this patent is extended or adjusted under 35 U.S.C. 154(b) by 1097 days.

(21) Appl. No.: 11/666,388

(22) PCT Filed: Oct. 20, 2005

(86) PCT No.: PCT/GB2005/004051
§ 371 (c)(1),
(2), (4) Date: Oct. 5, 2007

(87) PCT Pub. No.: WO2006/048604
PCT Pub. Date: May 11, 2006

(65) Prior Publication Data
US 2008/0175596 A1    Jul. 24, 2008

(30) Foreign Application Priority Data
Nov. 4, 2004   (GB) .................................. 0424432.3

(51) Int. Cl.
*H04B 1/00* (2006.01)
(52) U.S. Cl. ......... 375/142; 375/146; 375/150; 342/145
(58) Field of Classification Search .................. 375/142, 375/146, 150; 342/145, 189, 378
See application file for complete search history.

(56) References Cited

U.S. PATENT DOCUMENTS

| | | | | |
|---|---|---|---|---|
| 4,613,862 A | | 9/1986 | O'Donnell et al. | |
| 5,157,408 A | * | 10/1992 | Wagner et al. | 342/399 |
| 5,499,265 A | * | 3/1996 | Dixon et al. | 375/150 |
| 5,793,327 A | | 8/1998 | Carnes et al. | |
| 5,999,561 A | * | 12/1999 | Naden et al. | 375/142 |
| 2003/0048430 A1 | | 3/2003 | Morcom | |
| 2003/0184469 A1 | * | 10/2003 | Brosche | 342/70 |
| 2004/0090361 A1 | | 5/2004 | Brosche | |

FOREIGN PATENT DOCUMENTS

| | | |
|---|---|---|
| EP | 0919835 | 6/1999 |
| EP | 1048960 | 11/2000 |
| EP | 1030192 | 8/2002 |
| EP | 1457789 | 9/2004 |
| GB | 2303754 | 2/1997 |
| WO | WO 01/55746 | 8/2001 |
| WO | WO 02/082201 | 10/2002 |

* cited by examiner

*Primary Examiner* — Khanh C Tran
*Assistant Examiner* — David Huang
(74) *Attorney, Agent, or Firm* — Blakely, Sokoloff, Taylor & Zafman

(57) ABSTRACT

Optical correlators are discussed, suitable for in-vehicle distance measurement. The correlators use modulation sequences based on maximal length sequences. A number of different modulation sequences are obtained by generator (32) from a single maximal length sequence, either by adding a variable number of cycles to the end of the maximal length sequence or by starting the maximal length sequence at different points in the sequence.

5 Claims, 3 Drawing Sheets

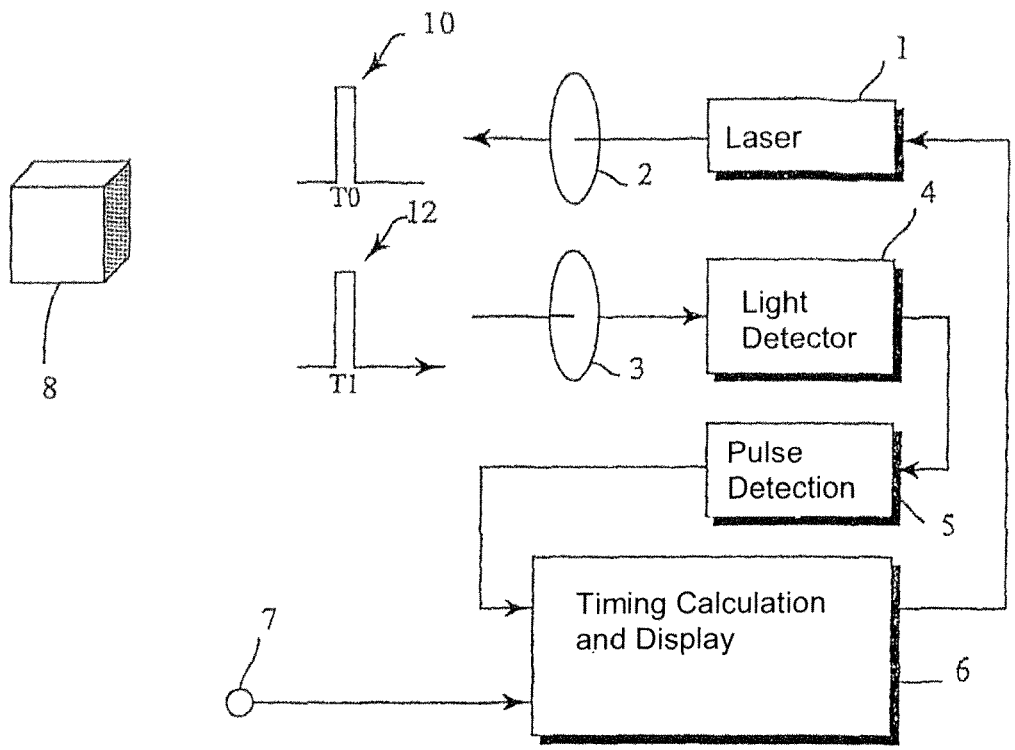
Fig.1
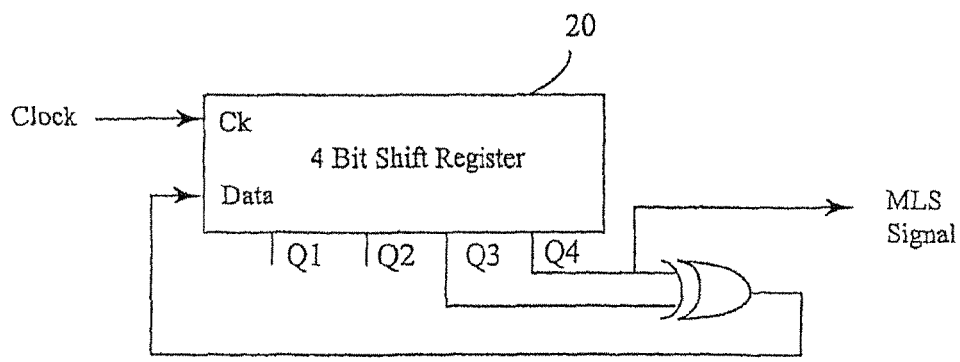
Example MLS Signal
Fig.2
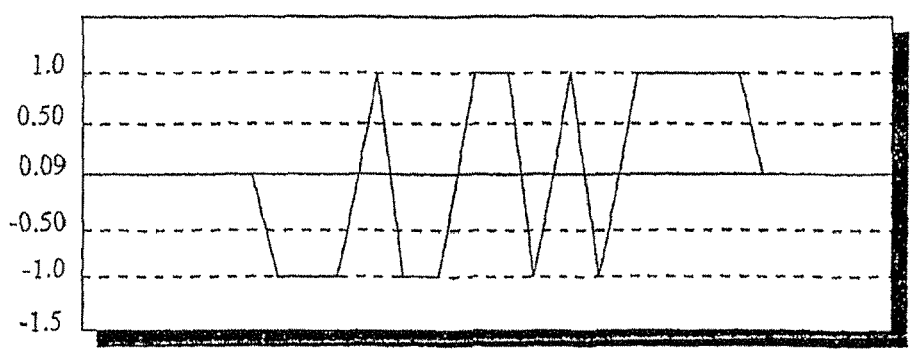

OPTICAL CORRELATION APPARATUS AND METHOD

FIELD OF THE INVENTION

The invention relates to apparatus and a method for an optical correlation measurement and in particular but not exclusively to a method and apparatus for optical correlation for automotive applications.

DESCRIPTION OF RELATED ART

Various optical detection devices are available for measuring the distance to a remote object. Such devices may be used, for example, in vehicle collision avoidance systems.

One common approach to measuring distance to a far object is to measure the time of flight of a pulse of light from the measuring system to the far object and back again, and then to calculate the distance to the far object based upon the speed of light. Systems employing this method commonly employ a laser to generate the light pulse and so are known generically as "laser range finders" (LRF's) or "light detection and ranging" (LiDAR) systems. Typical applications are the measurement of altitude, target range or distance for survey applications in civil engineering and metrology. LRF's may be built as stand alone hand held units or embodied in larger systems.

A known LRF is shown in FIG. 1 and comprises a laser 1, an optical transmission system 2, an optical reception system 3, a light sensitive detector 4, pulse detection circuitry 5, and timing calculation and display electronics 6.

In operation, the user initiates a measurement of range using input 7, which causes a laser fire pulse to be sent to the laser 1 and the laser to emit a pulse of light at time T0 as represented by the plot 10. This pulse is focussed by the transmission optics 2 and travels to the remote object 8 where it is reflected. The receiving optics 3 collects a portion of the reflected light pulse illustrated as plot 12 and focuses the energy onto the light sensitive detector 4. The detector 4 converts the received light pulse into an electrical signal and the pulse detector 5 discriminates against any electrical noise generated by the light sensitive detector to provide a clean, logic level pulse from the incoming light detector signal at time T1.

This pulse is passed to timing calculation and display electronics 6 which calculates and displays the range to the remote object based upon the time of flight of the laser pulse (T1-T0) and the speed of light (c) in the intervening medium.

Often there are multiple pulses apparent within the reflected signal captured by the detector 4 due to reflections from a number of different objects (e.g. vegetation) in the path of the light pulse, or variations in the refractive index of the intervening atmosphere.

To deal with this, a correlation technique may be used.

PCT GB00/04968 discloses an optical distance measurement apparatus using a signal known as the Maximal Length Sequence (MLS). This is a family of pseudo random noise binary signal (PRBS) which are typically generated using a digital shift register whose input is generated from appropriate feedback taps. The maximal length sequence is the pseudo random noise sequence with the longest period which can be generated with a shift register of r sections. It has a length $N=2^r-1$ shift register clock cycles and has good auto-correlation properties as the auto-correlation function has only two values; either $-1/N$ or a peak of 1.0 at the point of correlation.

FIG. 2 illustrates one example of a maximal length sequence generated by a four stage shift register 20. Alternative length sequences can be generated by using longer shift registers with the appropriate feedback taps.

Oversampling can be used, i.e. sampling the maximum length signal at a multiple of the clock frequency of the maximal length signal. The multiple is known as the oversampling factor.

The system of PCT GB00/04968 provides various advantages and refinements to the basic use of an MLS sequence and provides a low cost apparatus for distance measurement and which can function over long range. In addition, the processing power required to operate the system is kept to a minimum.

These approaches need not be used purely for distance measurement and some estimates of surface texture can also be achieved as set out in WO 02/082016. In this, a light source output is scanned and received in a multi-region light detector which can be actuated separately. The times of flight from the light source to the different regions of the multi-region detector can be used to calculate a surface profile.

Such systems may be used in particular for automotive applications, including for example adaptive cruise control, in which distance and texture information may be used to adjust vehicle speed.

A problem that may occur in vehicle applications, as well as other applications, is the possibility of interference between similar systems.

This is addressed briefly in WO 02/082201 which suggests using a different oversampling factor or length of maximal length sequence if interference between two adjacent systems is detected.

However, the use of different oversampling factors results in significantly different lengths of modulation signal which complicates the design of the signal processing. and larger oversampling factors reduce the ability of the system to discriminate between close objects.

Thus, there remains a need for an improved approach to reducing interference between optical correlation systems.

BRIEF SUMMARY OF THE INVENTION

According to the invention there is provided a method of operating a correlation system, comprising:

providing a transmission modulation signal having an integration cycle period;

modulating a signal with the transmission modulation signal;

transmitting the modulated signal;

receiving a received signal which is a reflected and delayed version of the transmitted signal; and integrating the received signal cyclically over a plurality of integration cycle periods to identify correlation peaks between the transmitted and received signal to determine the time of flight of the signal;

wherein the step of providing a transmission modulation signal includes: providing a digital sequence having a sequence length k; and generating one of a plurality of transmission modulation sequences of different effective phase from the digital sequence by:

adding a variable number of items to the digital sequence and determining the integration cycle period based on the sequence length plus the variable number; and/or changing the phase of the digital sequence by, at intervals, restarting the digital sequence at a variable one of the items in the digital sequence.

By selecting from a number of modulation signals based on the digital sequence a number of different signals can be provided which have low cross-correlation between different signals and yet have a high autocorrelation allowing faint reflections to be picked up. This can be done without the need to generate different maximal length sequences, which can be technically quite difficult.

In practical systems, synchronous integration is used to improve the signal to noise ratio. This is often done using a circular buffer of the same length as the number of clock cycles of the modulation signal. The modulation signal is repeated, and the received signal added to the circular buffer for each peak. Whilst random noise produces a received signal that is not correlated with the modulation signal, reflections tend to be correlated with the modulation signal, and so produce correlation peaks.

The modified digital sequences still produce good performance with synchronous integration without requiring complex systems to generate a vast number of different maximum length sequences.

The transmitted signal may be an optical signal.

In one approach, the effective phase of the modulation signal is varied by adding to the digital sequence j additional clock cycles, where $j=\{0, 1 \ldots (k-1)\}$, so that the phase shifts by j clock cycles each period.

The additional clock cycles at the end of the maximal length sequence do not significantly reduce the auto-correlation properties and so allow synchronous integration to occur. Nevertheless, the different modulation signals of the group have low correlations with each other so reducing interference.

In an alternative approach, the step of generating one of a plurality of transmission modulation sequences includes changing the effective phase of the digital sequence at intervals by restarting the digital sequence at a variable one of the items in the digital sequence.

In this approach, where a circular buffer is used, the start point for the integration may change at intervals to ensure that the integration can continue. Different modulation signals will have different changes at uncorrelated times and so modulation signals from two different transmitters will be largely uncorrelated and so will not give rise to excessive correlations.

In embodiments, this is conveniently achieved by restarting the digital sequence at the j-th clock cycle, where j is an integer $1 \leq j \leq k$, in which j is changed at intervals to vary the phase.

The intervals are preferably not regular, and may conveniently be determined using a pseudorandom number generator.

The method is particularly suitable for optical correlation systems mounted in a vehicle. The method may then include determining distances from the vehicle to nearby objects from the identified correlation peaks.

The method is not applicable to transmitters with only one digital sequence, but more than one may be provided. In this case, the step of generating one of a plurality of transmission modulation sequences may further include selecting one of the digital modulation sequences.

The digital sequence is preferably a maximal length sequence, which may provide good autocorrelation properties.

In another aspect, the invention relates to a correlation system, comprising
a digital signal source providing a modulation signal based on a cyclical maximum length sequence;
a modulator for modulating a signal with the modulation signal;
a transmitter and a receiver for transmitting the modulated signal and for receiving a received signal which is a reflected and delayed version of the transmitted signal;
an integrator adapted to identify correlation peaks of the received signal with the modulation signal;
wherein the digital signal source includes at least one digital sequence having a sequence length k; and the digital signal source is adapted to generate one of a plurality of transmission modulation sequences of different effective phase from the digital sequence by:
adding a variable number of items to the digital sequence and determining the integration cycle period based on the sequence length plus the variable number; and/or changing the phase of the digital sequence at intervals by restarting the digital sequence at a variable one of the items in the digital sequence.

The invention also relates to a vehicle rangefinding system including such a correlator.

The invention also relates to a vehicle including such a correlator adapted to determine distances from the vehicle to nearby objects from the identified correlation peaks.

BRIEF DESCRIPTION OF THE DRAWINGS

For a better understanding of the invention, embodiments will now be described, purely by way of example, with reference to the accompanying drawings, in which:

FIG. 1 illustrates a prior art

FIG. 2 illustrates a prior art maximal length sequence;

DETAILED DESCRIPTION

Figure 3:
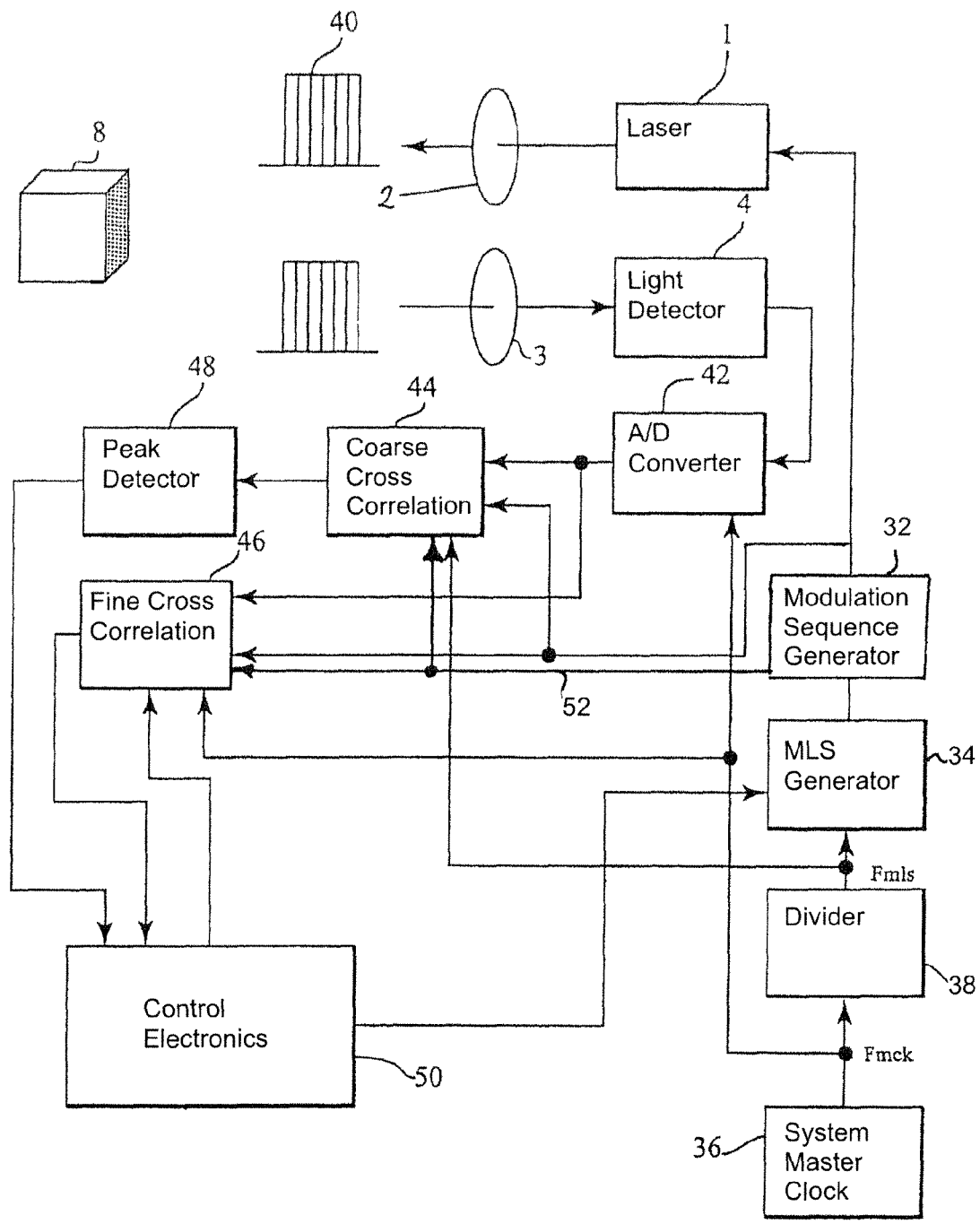
FIG. 3 illustrates a first embodiment of apparatus according to the invention.

One example of how optical distance measurement equipment based on the MLS technique can be improved by using the invention is illustrated in FIG. 3. The system is incorporated in a vehicle.

A maximal length sequence generator 34 is connected to master clock generator 36 through divider 38. This divider 38 generates a MLS frequency that is a fraction of the master clock frequency, and the maximal length sequence generator generates a maximal length sequence.

The maximal length sequence generator is connected in turn to modulation sequence generator 32 that modifies the maximal length sequence to be one of a number of modulation sequences. The modulation sequence generator is connected to laser 1 which generates an optical signal through transmission optics 2.

Receiving optics 3 receives light and focuses it onto light sensitive detector 4, which in turn feeds the signal to analogue to digital converter 42. The digital output is fed to both a coarse and a fine cross correlator. The coarse cross correlator acts at the lower MLS frequency and has an output connected to peak detector 48. This in turn feeds the location of detected peaks into controller 50. Controller 50 controls the fine cross correlator 46 and also accepts the fine cross correlator output.

In operation, the MLS generator clock signal is derived from the system master clock Fmck 36 by divider 38 so that the MLS clock frequency Fmls is a known sub-multiple M of the master clock signal. In effect, the MLS is stretched in time by factor M. The "stretched" MLS signal is used to generate one of a number of different modulation signals as will be explained in more detail below. The modulation signal causes the laser 1 to emit an optical stretched MLS signal starting at time T0, as represented at 40. This optical signal is focussed by the transmission optics 2 and travels to the remote object 8 where it is reflected. The receiving optics 3 collects a portion of the reflected optical signal and focuses this energy onto a light sensitive detector 4. This detector converts the collected light signal into an electrical signal which is digitised by the analogue to digital converter 42 and passed to coarse 44 and fine 46 cross-correlation calculation units. The digital to analogue converter sample clock is set equal to the system master clock frequency.

The coarse cross-correlation unit 44 is clocked at the MLS clock frequency Fmls and hence correlates a sub-sampled version of the digitised reflected MLS signal and original stretched MLS transmitted signal. The output from this cross correlation unit is a peak which is detected by pulse detector 48 and which indicates the coarse time delay Tc1 of the reflected signal.

Figure 4:
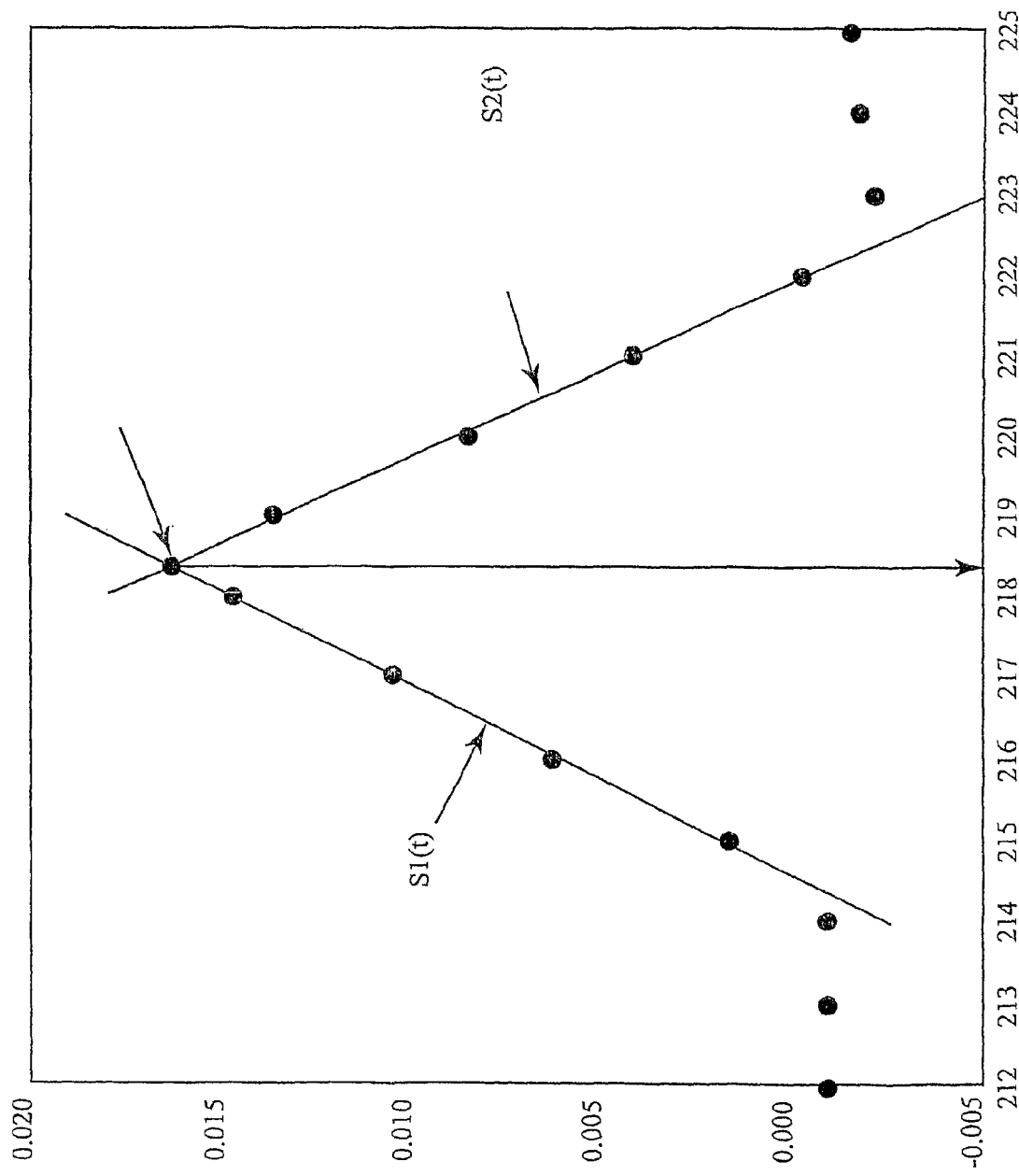
FIG. 4 illustrates the output of a correlator in the embodiment of FIG. 3.

The control electronics 50 then causes the fine cross-correlator 46 to calculate the cross-correlation of the transmitted and reflected signals only in the region of time delay Tc1. Typically, the fine cross-correlation function would be calculated for 2M samples before and after Tc1. The output of the fine cross correlator is the cross correlation function of the transmitted and reflected signals in the region of the peak as shown in FIG. 4, where M=4.

Note that the coarse and fine cross correlators use synchronous integration to greatly improve the signal to noise ratio. In effect, the correlators include a number of bins, one corresponding to each cycle of the modulation signal. Each bin collects the received signals corresponding to a particular point in the modulation signal over a number of repeats of the modulation signal, for example 1024 repeats. Only received signals in phase with the modulation signal will give high correlation with the modulation signal and other signals will not. Thus, the cross-correlators can effectively pick out a small signal reflected from object 8 from a substantial amount of extraneous signals or noise.

The shape of the correlation peak for a PRBS signal such as an MLS is a triangular pulse. This may be understood by viewing the MLS as the summation of a sequence of N identical pulses, each of width T=1/Fmls and appropriately delayed and summed together. The cross-correlation operation may be viewed as being similar to convolving the MLS with a delayed version of itself and then sampling the result at a frequency equal to the cross correlator clock frequency.

Therefore, the shape of the correlation peak output by the cross-correlation unit is given by the convolution function of two identical pulses of width T, which is a triangular pulse of width 2T=2/Fmsl, sampled by the cross correlator clock frequency, which for the fine cross correlator is Fmck=M×Fmls. Hence the cross correlation function output by the fine cross correlator 46 takes the form shown in FIG. 4.

Note that the fine cross correlator effectively oversamples the modulation signal since it operates at the master clock frequency which is a factor M greater than the sequence frequency.

This signal is passed to the controller 50 which calculates using known standard techniques the coefficients m1 and k1 for equation of the best fit line through the M samples prior to the peak of the signal:

$$s_1(T) = m_1 \cdot T + k_1$$

and the coefficients m2 and k2 for equation of the best fit line through the M/2 samples after the peak of the signal:

$$s_2(T) = m_2 \cdot T + k_2$$

These lines are shown plotted on FIG. 6. The timing, calculation and display electronics then compute the intersection T0 of the two best fit lines from:

$$T_0 = \frac{(k_2 - k_1)}{(m_1 - m_2)}$$

where T0 is an estimate of the time of the peak of the signal which equates to the time delay between the transmitted and reflected signals.

The distance to the object is then calculated from the determined time T0; it is half the speed of light multiplied by the time taken The modulation sequence generator generates one of a number of different modulation sequences from the maximal length sequence.

In a first approach, the modulation sequences are generated from the maximal length sequence by adding k sequence cycles to the end of the maximal length sequence. For example, the modulation sequence generator 32 can generate 25 different modulation sequences from a single maximal length sequence by selecting any integer value of k from 0 to 24 inclusive. The value of k is transmitted to the cross correlators through data path 52, and the cross correlators use this information to determine the repeat time of the modulation signal.

These modulation signals have the desirable property that they have a low correlation with each other over several repeats of the maximal length sequence. If the modulation sequences from two different generators are aligned for a first cycle, so long as the two values of k are different, they will not be aligned for the next cycle. This means that if two systems according to the invention are in operation in the same area, the integration carried out in the cross correlators means that reflections from other generators will be ignored.

When the system starts, the system is arranged to check whether any other units are generating modulation signals in its vicinity. It does this by cycling through different values of k without switching on the laser 1 and seeing if correlation patterns are observed. If, for example, the system detects other systems operating with values of k of 0, 1, and 4, the system chooses the lowest available value of k, 2, for its own transmission. Alternatively, a random available k can be selected and this latter approach has the advantage that if two systems start up at the same time, they are likely to select different values of k.

In another approach, the starting point of the maximal length sequence is shifted at irregular intervals by modulation sequence generator 32. Thus, for a maximal length sequence of length N, the start point can be the jth cycle. The parameter j can take any value from 1 to N. The value of j is transmitted through data path 52 to the cross correlators so that they can add the received signal to the correct data bins.

The parameter j changes from time to time. In particular, the value of j should preferably be changed on average less often than the repeat time of the modulation signal, but often enough so that it changes several times over the length of integration carried out by the cross correlators.

Since different transmitters will not have the same sequence of values of j reflected signals from different transmitters will not interfere constructively and so will be in phase.

In a preferred embodiment, the length of time between shifts of j is determined in a pseudo-random manner.

This approach has the significant benefit that a startup period is not required so long as the modulation sequence chosen is significantly random. The seed for the random number generator could be for example the number of kilometers the car has driven, or the length of time to the next service, so that not all cars use the same seed.

If intervehicle communication is possible then vehicles can collectively decide on different values of j or on appropriate modulation sequences.

Although the invention has been described with reference to a very specific correlation approach it should be emphasised that this is in no way essential and it is equally possible to implement the system with a single cross correlator if required.

Nor is the invention solely suitable for vehicle based systems and the approach may be used on any optical correlation equipment to reduce the likelihood of cross talk.

Further, the invention can use a small number of different maximal length sequences and generate a larger number of modulation signals from them without necessarily generating all modulation signals from a single MLS.

The sequence used need not necessarily be an MLS but any other digital sequence with suitable autocorrelation properties may be used.

The invention claimed is:

1. A method of operating a correlation system, comprising:
   providing a transmission modulation sequence having an integration cycle period;
   modulating a signal with the transmission modulation sequence to generate a modulated signal;
   transmitting the modulated signal;
   receiving a received signal which is a reflected and delayed version of the transmitted signal; and
   integrating the received signal cyclically over a plurality of integration cycle periods to identify correlation peaks between the transmitted and received signal to determine a time of flight of the signal;
   wherein the step of providing a transmission modulation sequence includes: providing a digital sequence having a sequence length k; and
   generating one of a plurality of transmission modulation sequences of different effective phase from the digital sequence by:
   changing the effective phase of the digital sequence by, at intervals, restarting the digital sequence at a variable one of the items in the digital sequence;
   wherein the effective phase is varied by restarting the digital sequence at the j-th clock cycle, where j is an integer $1 \leq j \leq k$, in which j is changed at intervals to vary the phase,
   including determining the intervals using a pseudorandom number generator.

2. A method according to claim 1 wherein there are provided a plurality of digital modulation sequences and the step of generating one of a plurality of transmission modulation sequences further includes selecting one of the digital modulation sequences.

3. A method according to claim 1 wherein the digital sequence is a maximal length sequence.

4. A correlator, comprising
   a digital signal source providing a modulation sequence based on a cylical maximum length sequence;
   a modulator for modulating a signal with the modulation sequence to provide a modulation signal;
   a transmitter and a receiver for transmitting the modulated signal and for receiving a received signal which is a reflected and delayed version of the transmitted signal;
   an integrator adapted to identify correlation peaks of the received signal with the modulation signal;
   wherein the digital signal source includes at least one digital sequence having a sequence length k; wherein the digital signal source is adapted to change the effective phase by restarting the digital sequence at a variable one of the items in the digital sequence;
   wherein the digital signal source is adapted to vary the phase of the transmission modulation sequence by restarting the digital sequence at the j-th clock cycle, where j is an integer $1 \leq j \leq k$, in which j is changed at intervals to vary the phase,
   said correlator further comprising a pseudorandom number generator to determine the intervals for varying the phase.

5. A correlator according to claim 4 wherein there are provided a plurality of digital modulation sequences and the digital signal source is adapted to select one of a plurality of digital modulation sequences to generate the transmission modulation sequence.

* * * * *

UNITED STATES PATENT AND TRADEMARK OFFICE
CERTIFICATE OF CORRECTION

PATENT NO. : 8,098,712 B2 Page 1 of 1
APPLICATION NO. : 11/666388
DATED : January 17, 2012
INVENTOR(S) : Christopher John Morcom It is certified that error appears in the above-identified patent and that said Letters Patent is hereby corrected as shown below:

In the Claims, Column 8, Claim 1, line 6, please delete "$1 \leqq j \leqq k$" and insert --$1 \leq j \leq k$--.

In the Claims, Column 8, Claim 3, line 34, please delete "$1 \leqq j \leqq k$" and insert --$1 \leq j \leq k$--.

Signed and Sealed this
Fourth Day of September, 2012

David J. Kappos
*Director of the United States Patent and Trademark Office*